Feb. 16, 1926.
M. T. COELHO
1,573,222
WEED PULLER
Filed July 13, 1925
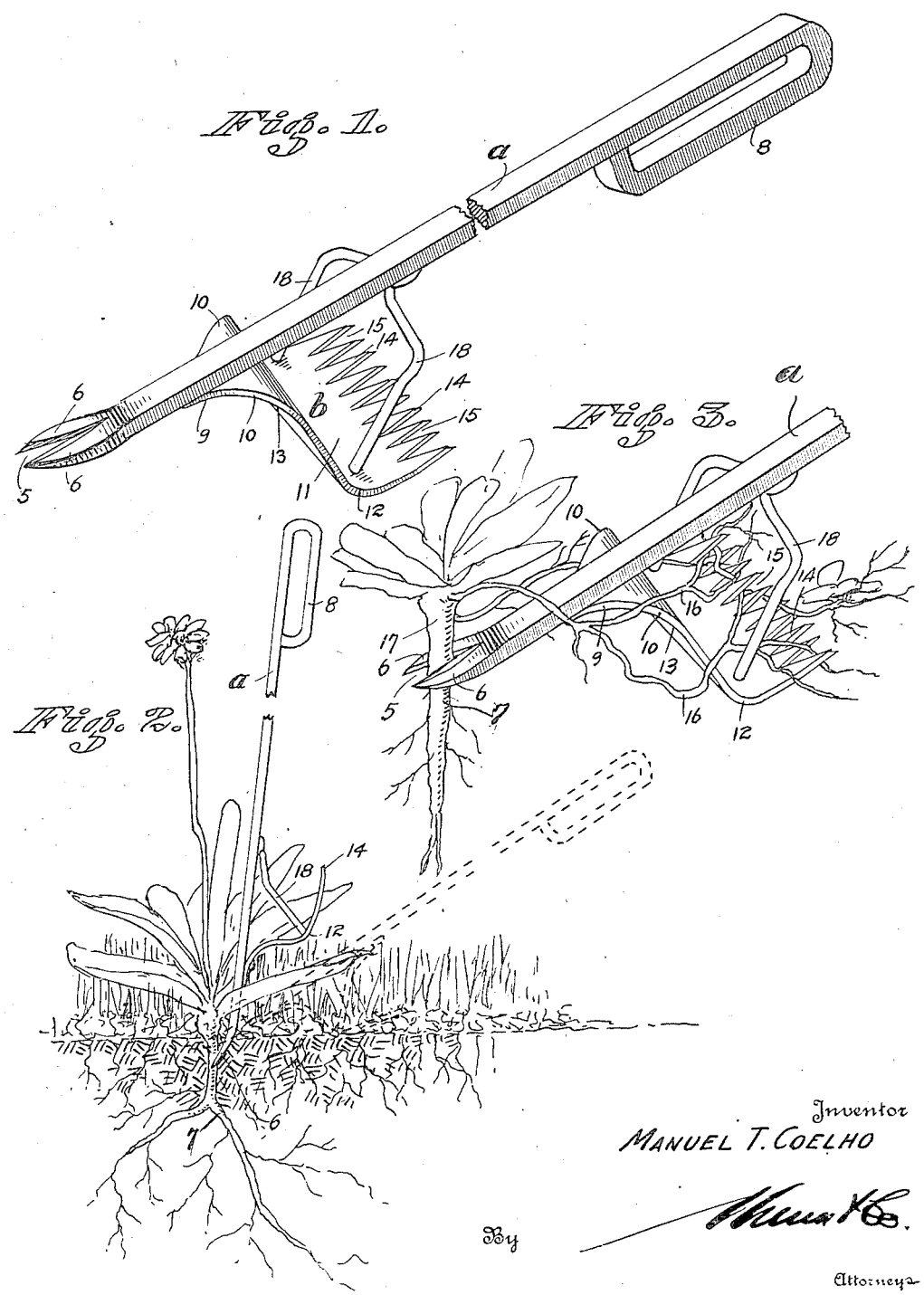
Inventor
MANUEL T. COELHO
By
Attorneys Patented Feb. 16, 1926.

1,573,222

UNITED STATES PATENT OFFICE.

MANUEL T. COELHO, OF REDWOOD CITY, CALIFORNIA.

WEED PULLER.

Application filed July 13, 1925. Serial No. 43,369.

*To all whom it may concern:*

Be it known that I, MANUEL T. COELHO, a citizen of the Republic of Portugal, and a resident of Redwood City, in the county of San Mateo and State of California, have invented a new and useful Improvement in Weed Pullers, of which the following is a specification.

The present invention relates to improvements in pulling implements for use in connection with the pulling of weeds from grass lands.

The general object of the invention is to adapt a weed puller for easy insertion into the ground and for positively engaging the root of the weed to be pulled, and further in adapting the puller to pull the weed with a minimum of effort on the part of the operator.

Another object of the invention is the provision of a weed puller ideally adapted for use in the pulling of weeds that send out runners or branches from the main stem and which take root in the soil.

The above and other objects are accomplished by instrumentalities pointed out in the following specification.

The invention is clearly defined in the claims.

A satisfactory embodiment of the invention is illustrated in the accompanying drawings forming part of the specification and in which—

Figure 1 is a contracted perspective of the invention.

Figure 2 is a side elevation showing by full and dotted lines two positions of the device in use.

Figure 3 is a fragmentary perspective showing the root pulling and runner pulling portions of the device in use.

The body *a* of the tool of the present invention is by preference formed of metal such as a piece of bar stock. For ordinary purposes or for use with weed roots of ordinary size, the body *a* may be formed of a single piece of metal sufficiently long to permit the tool to be used as a lever wherein the fulcrum or support is disposed between the opposite ends. In instances where relatively large roots are to be pulled, the dimensions of the body are accordingly increased and if need be indicated elongation may be effected by the provision of a long handle and adapting the body *a* to be connected to the same. One end of the body *a* is provided with a substantially V-shaped longitudinal cleft 5 and claws 6—6. The claws are made relatively flat and thin and terminate in sharpened points which easily penetrate the ground for the required depth when downward pressure is applied to the body *a* by the hand of the operator. The cleft 5 receives the root 7 of the weed to be pulled as shown in Figure 2, and the root becomes wedged and positively held within the cleft when the engaging end is swung upwardly and outwardly from the position shown by dotted lines in Figure 2. A suitable handle is provided on the end portion of body *a* remote from the claws 6—6 and, as shown, this handle may be formed by bending the end portion of the body on itself as indicated by 8.

A support or fulcrum *b* is rigidly secured to the lower face of body *a* or that face presented toward the ground when the tool is pulling a weed. The end portion 9 of the support *b* which is secured to body *a* is relatively narrow and conforms approximately to the width of body *a*. From this connected end 9 the opposite sides 10—10 extend on diverging lines for portions of their lengths and terminate in parallel portions so that the free end or base of support *b* is relatively wide. The spaced portions of the body 11 of the support are curved transversely in opposite directions, as indicated by 12, 13, so that the said body when the engaging end is within the ground curves outwardly and upwardly from the connected end portion 9. By virtue of this construction the curved portion 13 adjacent to the connected end 9 is arranged to abut the ground and thereby serves as a stop for limiting the movement of the engaging end of the tool into the ground, while the area between the free end of body 11 and the curved portion 12 serves as a turnable support or fulcrum by turning on the ground in the upward and outward movement of the engaging end of the tool. The free end of body 11 is provided with a row of angular shaped teeth 14 and intervening V-shaped recesses 15, which combine with the teeth to provide the elements of an ordinary rake. The provision of the teeth 14 adapts the device for use in the pulling of so-called creeping weeds, such as Bermuda grass. As shown in Figure 3, the teeth 14 are readily engaged with the runners or creepers 16 which are then uprooted by pulling, after which the engaging end may be employed to remove the weed 17 which sends out the runners or creepers 16. In this way a single plant of Bermuda grass, together with the runners thereof, may be pulled from the ground as an entirety by the tool of this invention, as clearly shown in Figure 3. A substantially inverted U-shaped strut 18 having its free ends connected to the body portion 11 is also connected to the body $a$ and by its presence serves to brace the latter while in use.

In operation the body $a$ is held substantially upright and the engaging end directed into the ground at a point adjacent to the weed to be pulled. When the curved portion 13 abuts the surface of the ground, downward pressure is then applied to the handle 8 which operates to turn the engaging end upwardly and outwardly through the ground and into engagement with the root of the plant. In the pulling of the root, the curved portion 12 rotates upon the surface of the ground, its relatively great width preventing it from sinking or embedding itself into the ground. The turning movement of the support facilitates the uprooting of the plant and the outward extension of the body 11 permits the engaging end to move above the ground by providing a support or fulcrum of appreciable highth. This feature in the present device is of importance in that the highth of fulcrum afforded by body 11 and the turnability of the said body upon the ground increase the duration of the pull on the weed by the engaging end above what would be had with the support or fulcrum of ordinary construction.

Although I have shown and described one embodiment of my invention, it is to be understood that the same is susceptible of various changes and I reserve the right to employ such as may come within the scope of the appended claims.

I claim:

1. A weed puller comprising a body having a longitudinal cleft end portion adapted to be inserted into the ground and engage the root of a weed to be pulled, a rigid support rigidly secured at one end to the body and extending outwardly and upwardly when the engaging end is within the ground, said support having one end secured to the body and its opposite end portion curved to provide a receding fulcrum on which the device is adapted to turn upon the surface of the ground and elevate the engaging end therefrom when the end portion of the body above the ground is turned in one direction.

2. A weed puller comprising a body having an engaging end portion provided with oppositely disposed claws having pointed ends and a longitudinally disposed intervening V-shaped cleft, the opposite end portion of said body being provided with a handle, and a support connected to one end of the body adjacent to the engaging end thereof and curving outwardly and toward the handle, and having its free end provided with a row of angular shaped teeth.

3. A weed puller comprising a body having an engaging end portion provided with oppositely disposed claws having pointed ends and a longitudinally disposed intervening V-shaped cleft, the opposite end portion of said body being provided with a handle, a support connected to one end of the body adjacent to the engaging end thereof and curving outwardly and toward the handle, and having its free end provided with a row of angular shaped teeth, and a strut or brace connected to the support and to the body.

MANUEL T. COELHO.